United States Patent
Patel et al.

(10) Patent No.: US 6,196,327 B1
(45) Date of Patent: Mar. 6, 2001

(54) EDC DRAFT FORCE BASED RIDE CONTROLLER

(75) Inventors: Ketan B. Patel, Naperville; Hong Chin Lin, Elgin; Alan D. Berger, Winfield; Wael Farag, Palos Hills, all of IL (US); Aftab Ali Khan, Dearborn, MI (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/285,204

(22) Filed: Apr. 1, 1999

(51) Int. Cl.$^7$ .................................................. A01B 63/112
(52) U.S. Cl. .................................................. 172/7; 701/50
(58) Field of Search ................ 172/7, 2, 4, 4.5, 172/12, 11, 8; 701/50

(56) References Cited

U.S. PATENT DOCUMENTS

| | | | |
|---|---|---|---|
| 3,516,498 | 6/1970 | Schowalter | 172/9 |
| 4,108,463 | 8/1978 | Old | 280/460 A |
| 4,132,273 | 1/1979 | Mortonson et al. | 172/2 |
| 4,236,724 | 12/1980 | Schillings | 280/460 A |
| 4,271,910 | 6/1981 | Schafer | 172/7 |
| 4,385,353 | 5/1983 | Schneider | 364/424 |
| 4,470,121 | 9/1984 | Ebert | 364/508 |
| 4,502,708 | 3/1985 | Taplin | 280/755 |
| 4,553,605 | 11/1985 | Katayama et al. | 172/2 |
| 4,667,744 | 5/1987 | Kauss et al. | 172/2 |
| 4,679,633 | 7/1987 | Kauss | 172/1 |
| 4,715,012 | 12/1987 | Mueller, Jr. | 364/900 |
| 4,796,712 | 1/1989 | Rutkowski et al. | 172/7 |
| 4,807,136 | 2/1989 | Rutkowski et al. | 364/424.07 |
| 4,809,179 | 2/1989 | Klinger et al. | 364/424.05 |
| 4,852,657 | 8/1989 | Hardy et al. | 172/2 |
| 4,878,543 | 11/1989 | Kauss | 172/2 |
| 4,924,943 | 5/1990 | Maichle | 172/1 |
| 4,979,092 | 12/1990 | Bergene et al. | 364/148 |
| 5,116,188 | 5/1992 | Kurohashi et al. | 414/719 |
| 5,143,159 | 9/1992 | Young et al. | 172/8 |
| 5,147,172 | 9/1992 | Hosseini | 414/719 |
| 5,372,204 | 12/1994 | Scheiss | 172/11 |
| 5,421,416 | 6/1995 | Orbach et al. | 172/4 |
| 5,469,921 | 11/1995 | Orbach et al. | 172/4 |
| 5,549,166 | 8/1996 | Orbach et al. | 172/4 |
| 5,810,095 | 9/1998 | Orbach et al. | 172/2 |
| 5,884,204 | 3/1999 | Orbach et al. | 701/50 |
| 5,890,870 | 4/1999 | Berger et al. | 414/699 |

FOREIGN PATENT DOCUMENTS

| | | |
|---|---|---|
| 15 57 862 | 4/1970 | (DE) . |
| 28 56 583 C2 | 6/1980 | (DE) . |
| 29 10 180 A1 | 10/1980 | (DE) . |
| 33 46 892 C2 | 7/1985 | (DE) . |
| 35 01 568 C2 | 9/1985 | (DE) . |
| 34 46 811 C2 | 7/1986 | (DE) . |
| 38 16 166 C2 | 11/1989 | (DE) . |
| 39 42 057 A1 | 6/1991 | (DE) . |
| 41 19 414 A1 | 12/1992 | (DE) . |
| 42 21 943 C2 | 3/1993 | (DE) . |
| 42 16 780 C2 | 12/1993 | (DE) . |
| 44 06 892 A1 | 9/1995 | (DE) . |

(List continued on next page.)

OTHER PUBLICATIONS

"Elektronisch pflügen", Fluid, Apr. 1982, pp. 12–17.

*Primary Examiner*—Christopher J. Novosad
(74) *Attorney, Agent, or Firm*—Foley & Lardner

(57) ABSTRACT

A system for reducing tractor pitching is disclosed, including a tractor with a hitch couplable to an implement, a force transducer that provides a force signal indicative of a force applied to the hitch by an implement, a position transducer to provide a position signal indicative of a position of the hitch, a hydraulic actuator to raise and lower the hitch, a control valve that responds to the force and position transducers to generate a valve signal, where the control circuit receives the force and position signals and drives a pitch-reducing control valve signal therefrom.

22 Claims, 6 Drawing Sheets

FOREIGN PATENT DOCUMENTS

| | | |
|---|---|---|
| 44 16 194 A1 | 11/1995 | (DE) . |
| 196 08 758 A1 | 9/1997 | (DE) . |
| 0 033 923 A1 | 8/1981 | (EP) . |
| 0 048 604 A1 | 3/1982 | (EP) . |
| 0 090 971 B1 | 10/1983 | (EP) . |
| 0 299 223 A2 | 1/1989 | (EP) . |
| 0 341 459 A2 | 11/1989 | (EP) . |
| 0 341 459 B1 | 11/1989 | (EP) . |
| 0 381 788 B1 | 8/1990 | (EP) . |
| 0 433 669 A1 | 6/1991 | (EP) . |
| WO 97/47175 | 12/1997 | (WO) . |

EDC DRAFT FORCE BASED RIDE CONTROLLER

FIELD OF THE INVENTION

The present invention relates to controlling the ride of a tractor coupled to a suspended implement. In particular, the present invention relates to controlling the ride of the tractor by controlling the height of the implement with respect to the tractor.

BACKGROUND OF THE INVENTION

Agricultural tractors provide a variety of functions on a modern farm, including cultivating fields with a variety of implements, towing implements and trailers, and excavating with front end loaders. The implements are typically coupled to the tractor using several mechanical linkages, which permit the implement to be raised and lowered with respect to the tractor by hydraulic cylinders or other actuators. A common hitch provided on many agricultural tractors is the "three-point hitch." This hitch permits an implement to be coupled to the tractor and supported as an overhanging load, or lowered and forced into the ground. Plows and other ground cultivating implements are typically supported in this manner.

During typical farm operations, tractors with their attached implements in a raised position travel over roads at relatively high speeds to go from field to field. During these transport phases, with the implement raised the suspension, or the lack thereof, causes the tractor to bounce and pitch as it travels. Depending upon the weight of the implement, and the corresponding degree of bouncing and pitching, it can be difficult to control the tractor.

In an attempt to improve roadability, various systems have been developed for interacting with the implements, their associated mechanical linkages and hydraulics to control bouncing and pitching while operating at road speeds. One such system includes circuitry for lifting and tilting an implement combined with a shock absorbing mechanism. This system permits relative movement between the implement and the vehicle to reduce pitching of the vehicle during road travel. Other systems for improving the performance of vehicles have included accumulators, which are connected and disconnected to the hydraulic system depending upon the speed of the vehicle.

Some systems use existing instrumentation on the vehicle, such as load sensors adapted to measure the load on the hitch and position sensors adapted to measure the height of the hitch, to actively control the position of the implement with respect to the vehicle while the vehicle is moving down the road. For example, U.S. Pat. No. 4,924,943 (issued to Maichle, May 15, 1990) discloses an Automatic Pitch Vibration Damping Mechanism for an agricultural tractor that monitors the hitch position and load using position and load sensors that are employed when the implement is being pulled through the earth to control the load and the depth of the implement. In the Maichle reference, the control system provides a signal to the control valve that lifts or lowers the implement. This valve signal is the sum of two signals, a position signal that is a function of the difference between the actual position of the hitch and a nominal hitch position, and a force signal that is a function of the difference between the actual force on the hitch and a nominal force. The force regulating circuit 36 provides a signal to the control valve related to the force on a load pin, and the position regulating circuit 42 provides a signal to the control valve that is related to the distance the hitch is from a nominal position. These two signal components are summed at block 39 and applied to the control valve to move the hitch.

The Maichle reference describes several limitations to his system. The force signal is based on a nominal force created by low-pass filtering the actual force. This nominal force is perturbed when the vehicle goes around a curve causing the implement to rise until it hits a mechanical stop or abutment in the curve, and causing the implement to fall until it hits the pavement once out of the curve. The curve-hitting problem is limited by preventing the nominal force value from changing rapidly. Whenever the system raises the implement up high (e.g. when the control system overcorrects upwardly in the curve) the nominal force value is permitted to change quite slowly by providing a large time constant. These problems arise from the use of a reference hitch force created by taking the time average (i.e. low pass filtering) of the actual hitch force.

What is needed is an improved system for reducing the pitching of a tractor that positions the tractor hitch without requiring a hitch position-based variable low-pass filter time constant for calculating a nominal force value that is combined with an actual force value and presented to a regulator to be later combined with a position error calculation and applied to a valve constant.

SUMMARY OF THE PRESENT INVENTION

In accordance with a first embodiment of the invention a system for reducing the pitching of a tractor having a hitch is provided, including an agricultural tractor, a hitch coupled to the tractor and couplable to an implement that is disposed to raise and lower the implement with respect to the tractor, a force transducer to provide a force signal indicative of a force applied to the hitch by an implement, a position transducer disposed to provide a position signal indicative of a position of the hitch with respect to the tractor, a hydraulic actuator disposed between the tractor and the hitch to raise and lower the hitch, a control valve disposed to control the flow rate of hydraulic fluid to and from the hydraulic actuator in response to a valve signal, and a control circuit that is coupled to and responsive to the force and position transducers to generate the valve signal where the control circuit is configured to receive the force signal and derive the valve signal therefrom and apply it to the control valve.

In accordance with the second embodiment of the invention, a method for reducing the pitching of a tractor having a hitch and an overhanging implement attached to that hitch is provided including the steps of monitoring a force indicative of a load applied to the hitch, monitoring the position of the hitch with respect to the tractor, and deriving a pitch-reducing control valve signal from the position of the hitch and the force.

Other principal features and advantages of the invention will become apparent to those skilled in the art upon review of the following drawings, the detailed description and the appended claims.

Figure 1:
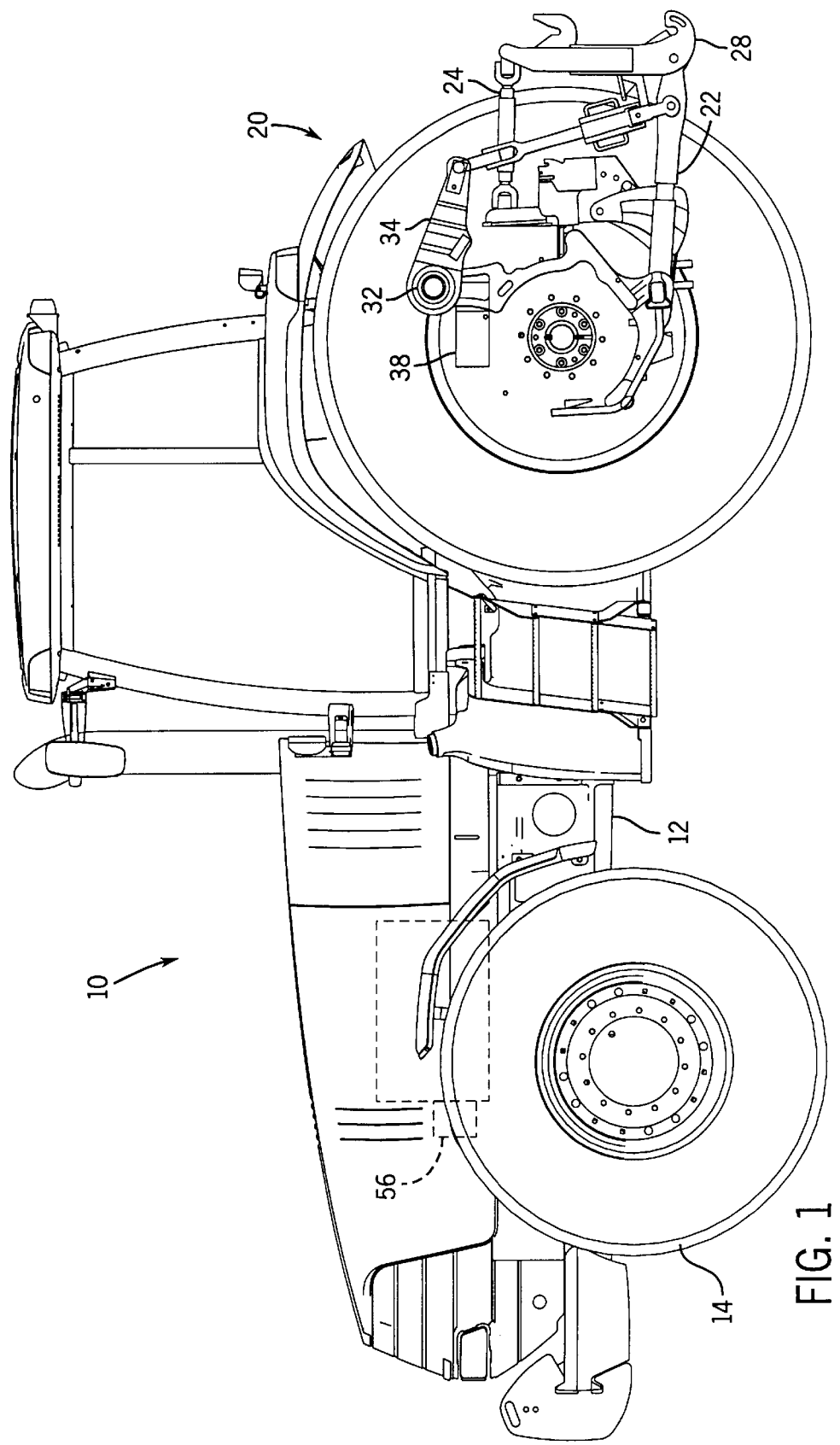
FIG. 1 is a side view of a tractor and hitch in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

A tractor 10 is shown having a frame 12 to which are coupled two front wheels 14 (only one shown) and two rear wheels 16 (only one shown). An engine 18 is fixedly mounted to the frame and drives front wheels 14 and rear wheels 16. A hitch 20 is coupled to the rear of the frame, and includes two lower links 22 (only one shown) pivotally mounted to tractor 10. Two upwardly extending lifting links 24 (only one shown) having lower ends 26 pivotally coupled to lower links 22 to raise and lower the free ends 28 of lower links 22 by pivoting lower links 22 upward or downward about their pivotal attachment points 30.

Hitch 20 also includes a rocker shaft 32 that is rotationally coupled to tractor 10, to permit rotational movement of rocker shaft 32 with respect to tractor 10. Two rocker arms 34 (only one shown) are coupled to the rocker shaft 32 and extend outwardly and rearwardly therefrom. The free ends 36 of rocker arms 34 are pivotally coupled to the upper ends of lifting links 24 to raise lifting links 24. A hydraulic actuator 38 is pivotally coupled to a second rocker arm 40 that in turn is coupled to rocker shaft 32 to rotate together with rocker shaft 32. When rod 42 of hydraulic actuator 38 is extended, second rocker arm 40 rotates counter-clockwise (in FIG. 2) about the rotational axis of rocker shaft 32 causing rocker shaft 32 to similarly rotate counter-clockwise. The rotation of rocker shaft 32 in turn causes rocker arms 34 to rotate counter-clockwise, which, in turn, raises the upper ends of lifting links 24. When lifting links 24 are raised, they raise the free ends of lower links 22. In this manner, extending the piston of hydraulic actuator 38 causes hitch 20 to raise with respect to tractor 10.

Figure 2:
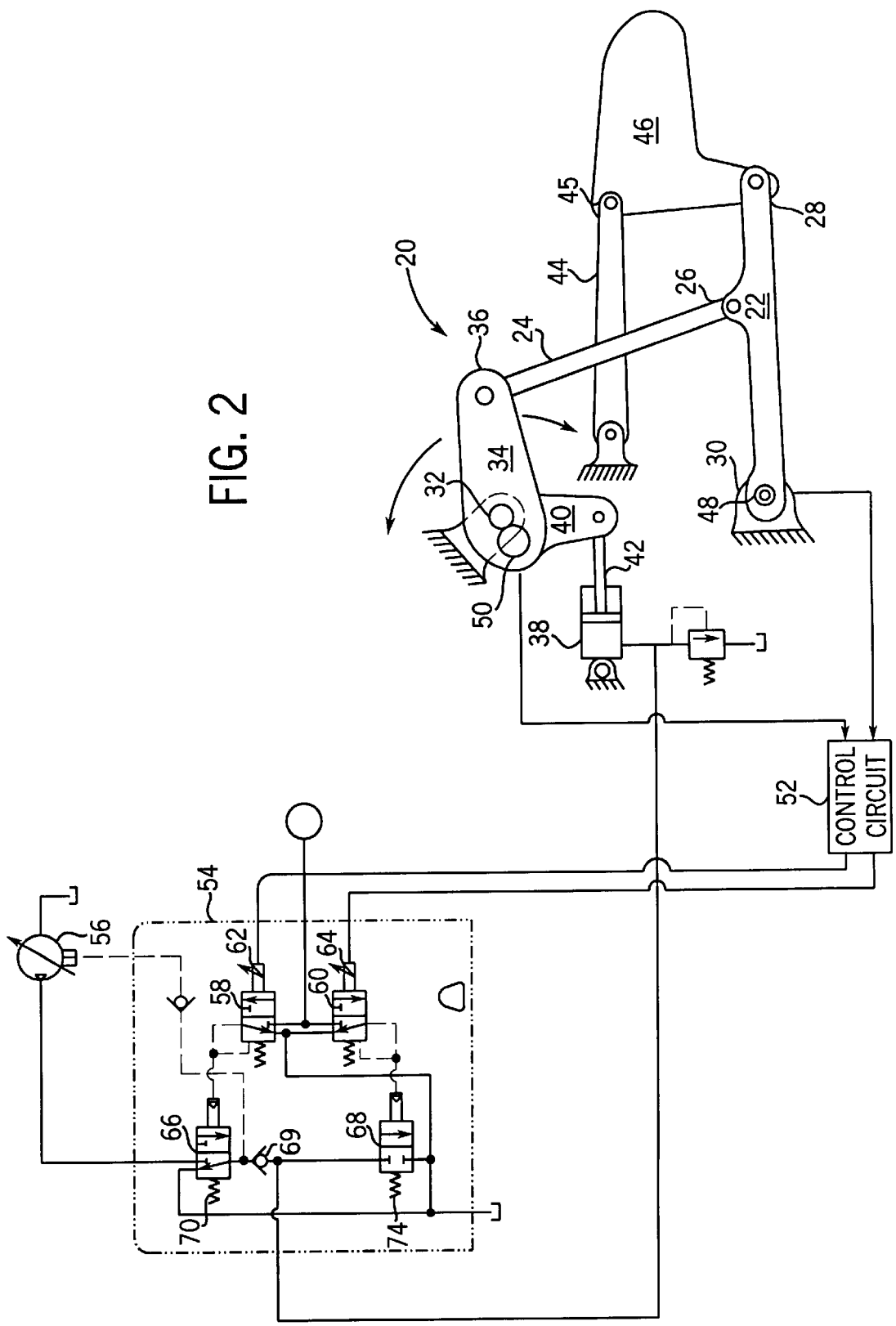
FIG. 2 is a schematic representation of the hitch and a control system for controlling the hitch.

Hitch 20 also includes an upper link 44 rotatingly coupled to tractor 10 at one end such that its free end 45 can raise or lower with respect to tractor 10. Hitch 20 is called a "three-point hitch" since an implement 46 can be attached to the two lower links 22 and the one upper link 44. These links are disposed apart from each other and are coupled to implement 46 such that when hydraulic actuator 38 is moved, the implement is constrained to be raised or lowered substantially in translation. As shown in FIG. 2, the implement is in a raised position, supported in tension by upper link 44 and in compression by lower links 22.

A force transducer, preferably in the form of two load pins 48 (one shown in FIG. 2), is provided to measure the load applied by lower links 22 to tractor 10—i.e. to provide a force signal indicative of the force applied to the hitch by the implement. The load pins couple the ends of lower links 22 to tractor 10, where each lower link has its associated pin. The load pin preferably measures the component of load that is perpendicular to the rotational axis of the load pin.

A position transducer 50, preferably a potentiometer is coupled to the end of rocker shaft 32 to sense the rotational position of rocker shaft 32 and hence the vertical position of implement 46, which bears a predetermined kinematic relationship to the position of the position sensor. This arrangement provides a position signal indicative of a position of the hitch (and hence the implement) with respect to the tractor.

Control circuit 52 is responsive to position transducer 50 and force transducer 48 to generate a valve signal that is applied to control valve 54.

To raise or lower the implement 46, the hydraulic actuator 38 is moved. When the actuator is extended, the implement is lifted with respect to the tractor and when the actuator is retracted, the implement is lowered with respect to the tractor. Hydraulic actuator 38 is raised and lowered by varying the amount of hydraulic fluid in the actuator. Hydraulic fluid under pressure is provided by pump 56, which is coupled to and driven by the engine. Pump 56 is in fluid communication with control valve 54, which controls the flow of pressurized hydraulic fluid from pump 56 to hydraulic actuator 38. Control valve 54 includes two pilot valves 58 and 60 that are actuated by solenoids 62 and 64, respectively, and two main valves 66 and 68 that are controlled by the pilot valves. Lifting pilot valve 58 controls the flow of pilot hydraulic fluid to one end of the spool of main lifting valve 66 causing the spool to shift and valve 66 to open. When opened, lifting valve 66 permits the flow of pressurized fluid from pump 56 to hydraulic actuator 38 through check valve 69 causing the actuator to fill and lift hitch 20 and implement 46. Lifting valve 66 is closed by spring 70, which causes the spool to shift when power is removed from solenoid 62. This causes lifting valve 66 to cut off flow from pump 56 to actuator 38. Check valve 69 prevents fluid in actuator 38 from leaking out. Lowering pilot valve 60 controls the flow of pilot hydraulic fluid to one end of the spool of main lowering valve 68 causing its spool to shift and valve 68 to open. When opened, lowering valve 68 permits the flow of pressurized fluid from hydraulic actuator 38 to tank 72, causing the actuator to empty thereby lowering hitch 20 and implement 46. Lowering valve 68 is closed by spring 74, which causes the spool to shift when power is removed from solenoid 64. This causes lowering valve 68 to cut off flow from actuator 38 to tank 72. Thus, when no power is provided to either lifting solenoid 62 or lowering solenoid 64, the hitch is suspended by hydraulic actuator 38 and does not move with respect to tractor 10.

Figure 3:
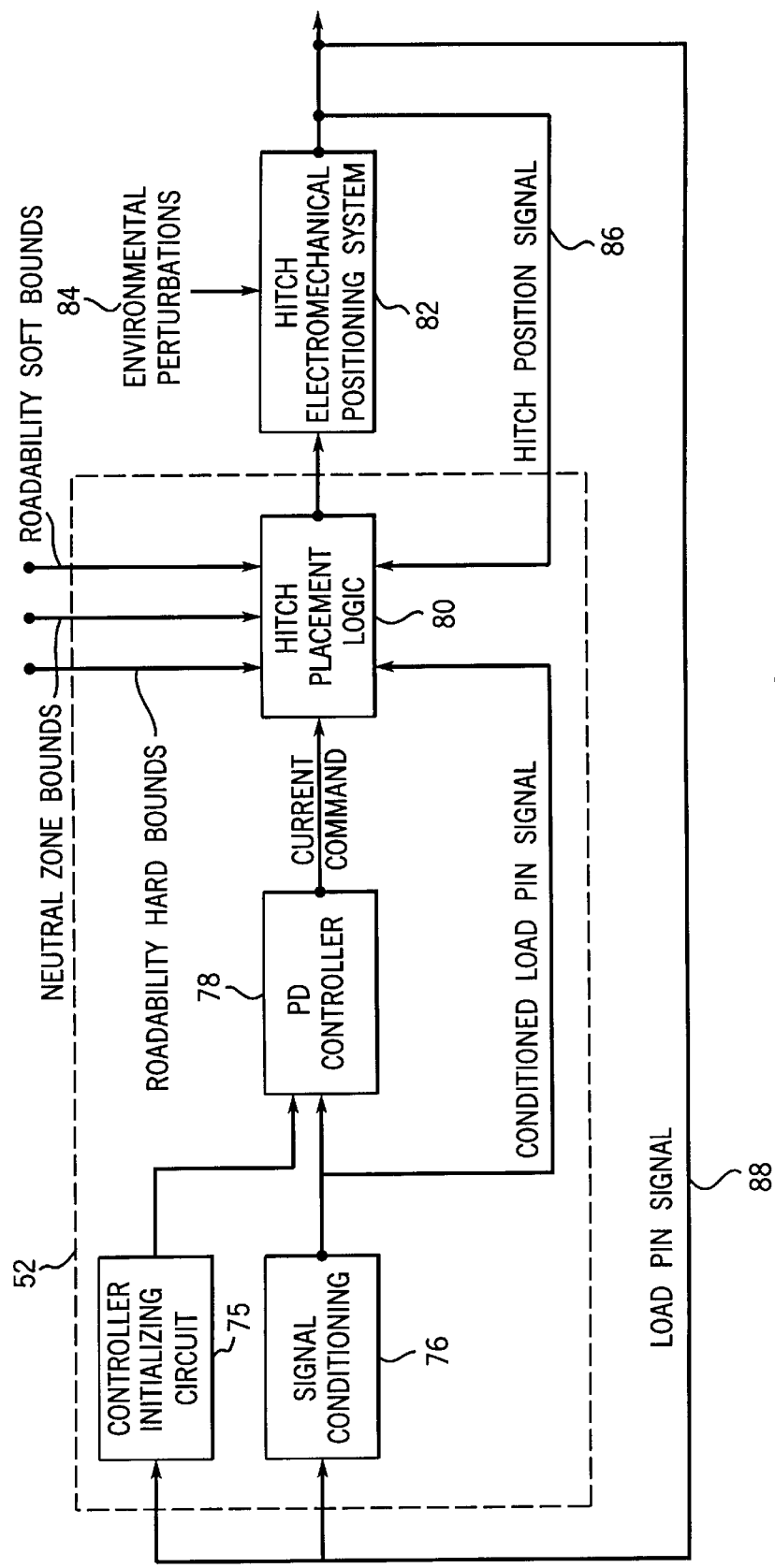
FIG. 3 is a block diagram of the control circuit of FIG. 2.

Referring to FIG. 3, control circuit 52 includes a controller initializing circuit 75 for initializing the PD controller circuit 78, a signal conditioning circuit 76 for conditioning the force signal provided by load pin 48, a PD controller circuit 78 for processing that conditioned signal (in accordance with a proportional-differential control algorithm) to produce a current command signal that reduces pitching and bouncing, and a hitch placement logic circuit 80 which determines, based upon the position signal provided by position transducer 50, the conditional load pin signal, and the current command signal, hitch 20, implement 46, tractor 10 and control valve 54, whether the current command signal should be applied directly to the control valve 54 to reduce pitching and bouncing, whether it should be attenuated and applied, or whether the hitch should be repositioned closer to a central position, and applies a repositioning signal, as needed.

Hitch electromechanical positioning system 82 receives a valve signal from hitch placement logic circuit 80. Positioning system 82 models the dynamic response of the mechanical system to environmental perturbations 84 such as an uneven road surface that act on the tractor, and together with the valve signal, affect hitch position signal 86 and the load pin signal 88, which feed back into the control circuit 52.

Figure 4:
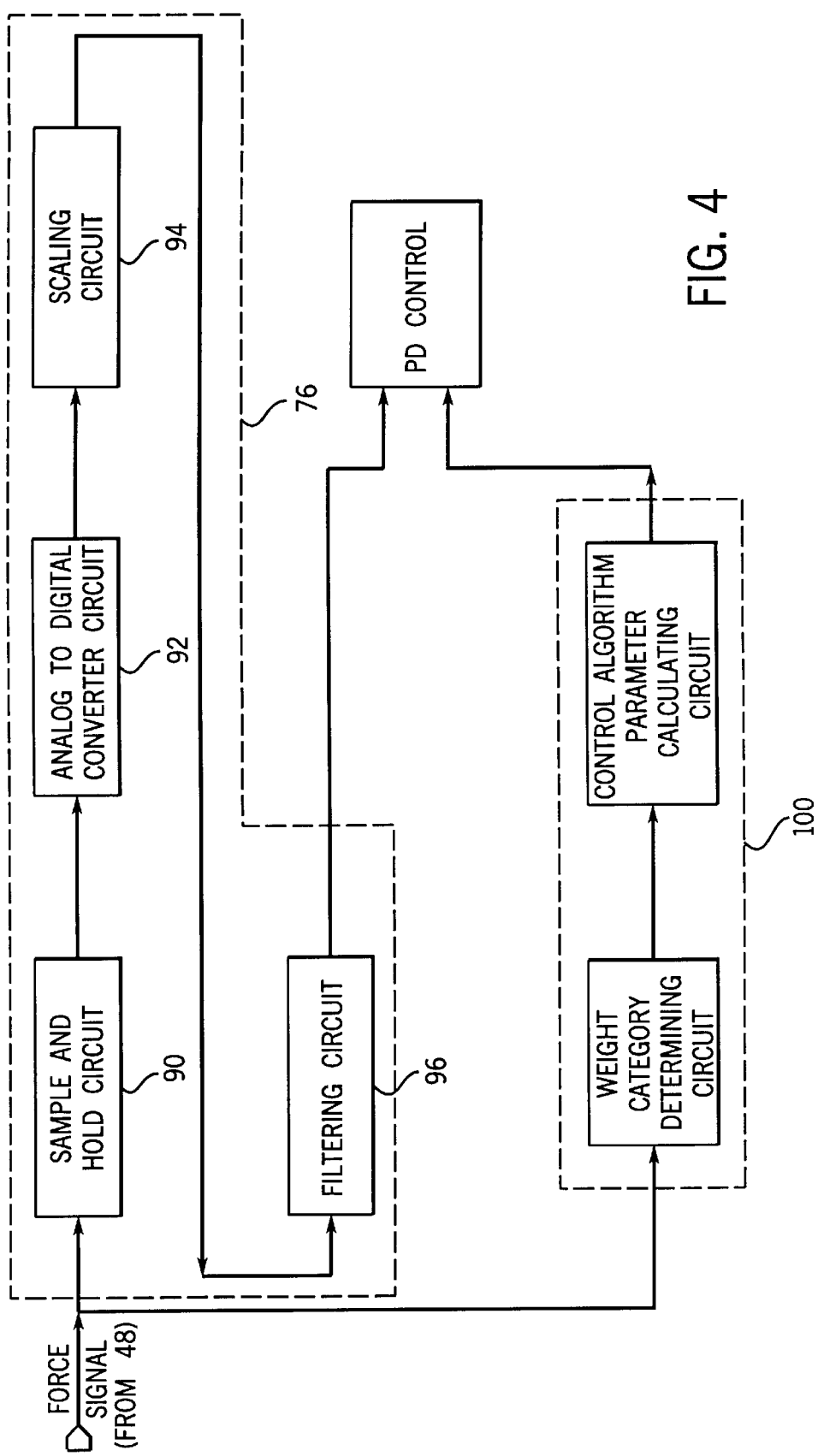
FIG. 4 is a detailed block diagram of the control circuit of FIGS. 2 and 3.

FIG. 4 is a detailed view of control circuit 52 showing details of its operation. The force signal is generated by force transducer 48. It is sampled by sample and hold circuit 90 approximately 100 times per second, or every 10 milliseconds.

The sampled force signal is then digitized by analog-to-digital converter circuit 92, which converts the sampled force signal into a stream of digital values with twelve bits of resolution.

A scaling circuit 94 is provided to receive and scale the sampled force signal into a range of values more convenient for the processor to work with. Since the analog-to-digital conversion was a 12-bit conversion, and the preferred processor manipulates 16-bit values, a scale factor of five is preferably applied, increasing the magnitude of each sampled value by 2.5 bits.

Filtering circuit 96 further conditions the converted and scaled force signal by band-pass filtering to pass only those portions of the force signal that are at frequencies of interest. For example, it has been determined that most agricultural tractor-and-implement combinations have bouncing and pitching frequencies that fall between 1 and 3 Hz. The bouncing frequencies predominating at the upper end of this range, and the pitching frequencies predominating at the lower end of this range. The force signal comprises higher frequencies as well, such as frequencies generated by the tractor's tire treads as the tires roll down the street, and frequencies generated by engine vibration. The amplitudes of these frequencies, however, are so small and the response time of the hydraulic components is so slow that it is quite difficult to counteract them using a hydraulic actuator as a controlled device.

Since the bouncing and pitching can be modeled as a series of underdamped sinusoidal waveforms in the 1–3 Hz range, and since the other frequencies are of no interest from the perspective of control, the 1–3 Hz band-pass filter directly indicates the force error that is to be controlled by the control algorithm circuit 98. The band-pass filter employed is a Chebychev infinite impulse response filter having −3 dB cutoffs frequencies of 0.8 and 3.1 Hz. The Chebychev filter is digitally iterated on receipt of each sample, or approximately every 10 milliseconds. With the sample rates provided above, this filter responds to a step change in force value within approximately 5–10 force samples, or within 50–100 milliseconds. This is about 18–36 degrees at an 1 Hz rate of oscillation. After filtering, the successive values of the force signal fluctuate both positively and negatively about a value of zero as the vehicle bounces and pitches up and down. If the vehicle is stopped, or there is very little discernable bouncing or pitching, the force signal stays close to zero, typically ranging from +5 to −5 counts. If the vehicle is perfectly still and thus there is no bouncing or pitching, the force value is typically zero.

The digitized force signal is also provided to a controller initializing circuit 100 which determines the weight category of the implement and calculates the parameters of control algorithm circuit 98 based on that weight. When control circuit 52 is initially turned on, controller initializing circuit 100 reads a series of converted force values from the analog-to-digital converter to produce a value indicative of the static weight of the implement. Depending upon these force readings, the controller initializing circuit 100 selects the control coefficients to be used by the PD controller circuit in processing the force signal. These coefficients are used by the PD controller circuit to generate the current command to be applied to the control valve. In the preferred embodiment, there are three different sets of control coefficients that may be selected by the controller initializing circuit: one set for light loads, one set for medium loads and one set for heavy loads.

The PD controller circuit 78 receives the filtered force signal provided by filtering circuit 96 and generates a current command for the control valve. The control algorithm of circuit 78 is preferably a proportional-differential control algorithm, in which the filtered force signal is multiplied by a proportional control coefficient, Kp, and the filtered force signal minus a just previously received filtered force signal, is multiplied by a differential control coefficient, Kd, and the two terms are summed. The two coefficients are empirically determined such that the sum will reduce the pitching and bouncing of the tractor when converted to a current and applied to the control valve. Thus, the signal (the sum) that is output from the PD controller circuit 78 is called the current command.

The current command is indicative of the signal that must be applied to the control valve to move the hitch in a manner that reduces the pitching and bouncing of the vehicle. Were the hitch and implement capable of an infinite number of vertical positions with respect to the tractor, the current command could be applied directly to the control valve. Unfortunately, any hitch can move through only a limited range of positions. Any hitch has an upper position limit at which the hitch is physically restrained from going any higher, typically a position at which further motion will cause physical interference between mechanical structures on the tractor and hitch. It also has a lower position limit at which the hitch or the implement to which it is attached will physically interfere with another mechanical structure on the tractor or with the ground.

If the current command was the sole signal applied to the control valve, there is a possibility that the current command, which seeks to minimize the filtered force signal, would attempt to move the hitch to its upper or lower position limits or beyond. This at best, would cause the hitch and implement to stop abruptly, banging them against the tractor or the ground. At worst, it will damage the tractor, hitch or implement. Even if no damage is caused, however, the abrupt stopping of the hitch and implement will itself cause substantial pitching and bouncing of the tractor and thus should be reduced if not eliminated.

Figure 5:
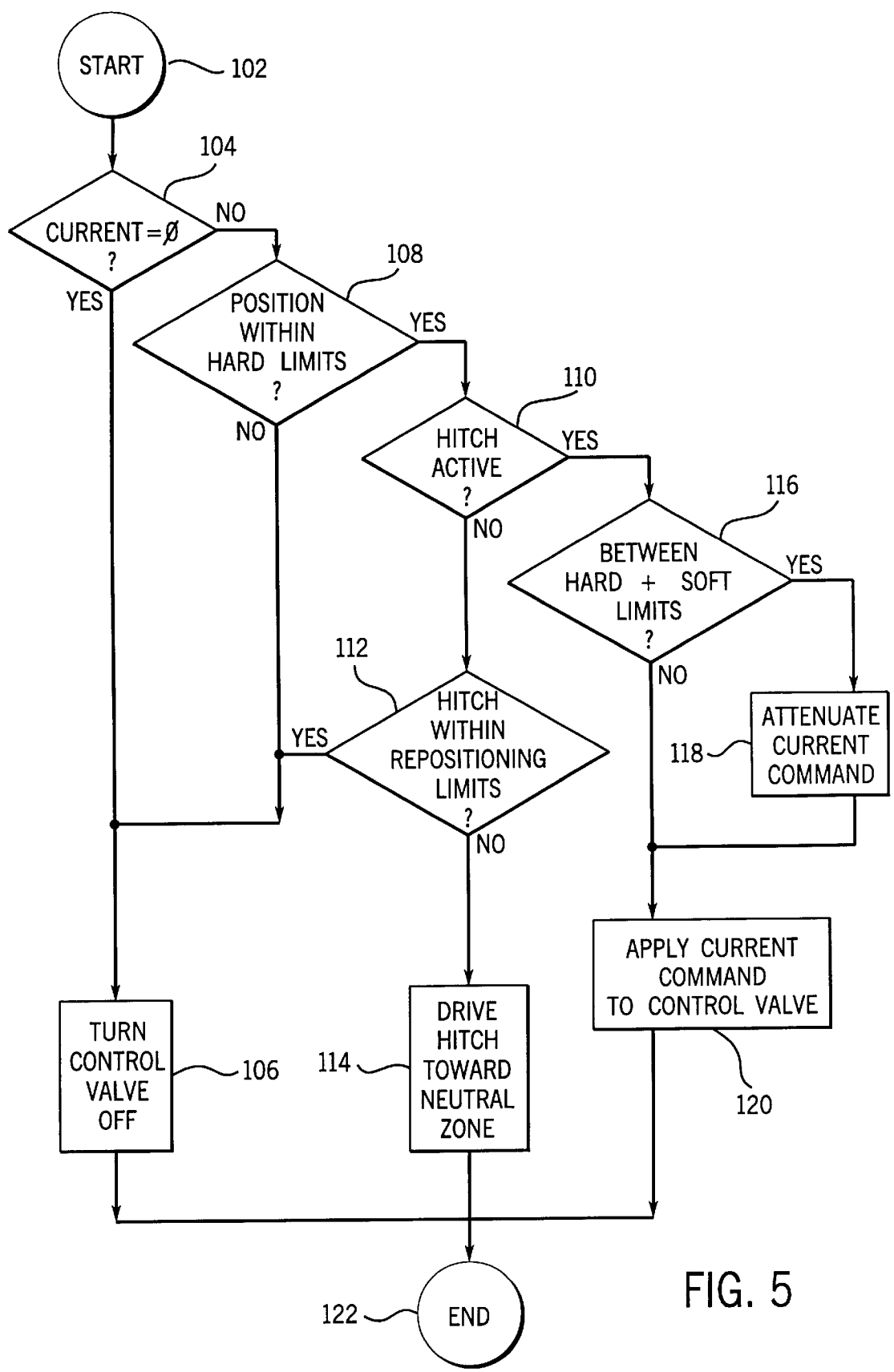
FIG. 5 is a flow chart showing the operation of the control circuit of FIGS. 2–4.

To prevent an abrupt collision at the upper or lower position limits, hitch placement logic circuit 80 (which is coupled to the position transducer) reads the position of the hitch using the position signal from the position transducer, reads the current command provided by PD controller circuit 78, reads the filtered force signal provided by filtering circuit 96 and determines whether the current command should be ignored, modified or applied directly to the control valve. The logic followed by the hitch placement logic circuit 80 is illustrated in FIG. 5. FIG. 5 illustrates a programming loop that begins with block 102 ("Start") and ends with block 122 ("End"). This program is repeatedly executed by logic circuit 80 every ten milliseconds while control system 52 is enabled.

Logic circuit 80 checks to see if the current command is equal to zero in block 104. If it is equal to zero the control valve 54 is turned off at block 106, neither filling nor emptying the hydraulic actuator. This has the effect of holding the hitch in its current position.

If the current command is not equal to zero (i.e. the hitch is either to be lifted or lowered according to the control algorithm) then the programming continues to block 108 where the logic circuit determines whether or not the current position of the hitch is within the "hard limits."

The full range of hitch positions can be considered to range from a position of 0% wherein the hitch is completely lowered and is restrained from further downward motion by the ground or some mechanical structure on the implement or tractor, and 100% where the hitch is completely raised and is restrained from further motion by some mechanical structure on the implement or tractor.

The "hard limits" are two positions, preferably located at 82% and 98% positions between which the motion of the hitch is constrained by the control circuit 52. In short, the hard limits define a 16% envelope within which the hitch can be positioned by control circuit 52. Block 108 constrains the motion between these limits by checking the hitch's current position, that is provided by the position signal from the position transducer and determining if the hitch is between the hard limits.

If the hitch is not in the range defined by the hard limits, logic circuit 80 does not apply the current command to the control valve, but instead turns the control valve off at block 106, which stops any filling or emptying of the hydraulic actuator. Thus, whenever the hydraulic actuator moves the hitch outside of the hard limits, the hitch is stopped, even though control algorithm circuit 98 may provide a current command that could be applied to the control valve to reduce pitching and bouncing. The current command is thus overridden and is not applied to the control valve.

On the other hand, if the hitch is within the hard limits in block 108, the logic circuit continues to block 110 wherein logic circuit 80 determines whether or not there is hitch "activity." If there is hitch "activity," the tractor is bouncing or pitching, and thus the current command provided by the PD controller circuit 78 should be employed to reduce the bouncing or pitching. If there is no (or little) bouncing or pitching, the system is essentially quiescent, and the hitch can be repositioned nearer to the middle of the range defined by the hard limits. As mentioned previously, control algorithm circuit 98 may generate a current command that will force the hitch to its limits causing an abrupt stop. Blocks 110, 112, 114 reduce this likelihood by repositioning the hitch away from the upper and lower position limits and toward a central position whenever the system is not active and therefore not substantially in need of pitch and bounce control.

To do this, the logic circuit monitors successive values of the filtered force signal to determine the magnitude of the filtered force signal. The filtered force signal in the preferred embodiment is the 1–3 Hz component of the force measured at the load pins. Plotted as a waveform, the successive values of the filtered force signal will assume a roughly sinusoidal waveform where the peak-to-peak amplitude is roughly equivalent to magnitude of the bouncing and pitching of the tractor. If there is no bouncing or pitching "activity," the positive or negative peaks will therefore be relatively small, and the slope of the waveform around zero will also be small. The logic circuit 80 monitors this activity by determining what the peak values of the force signal are, and determines whether these peaks are relatively small. In the preferred embodiment, logic circuit 80 compares the current filtered force signal value with a previous filtered force signal value to determine if previously rising values have now started falling (a maxima has been reached) or whether previously falling values have started rising (a minima has been reached). When a maxima or a minima is reached, logic circuit 80 saves these maximum and minimum values for later reference. Alternatively, logic circuit 80 could determine the slope of the filtered force signal when it passes through or close to zero and use the steepness of slope as a measure of the "activity." The greater the slope at a zero crossing, the more the hitch activity.

At block 110, logic circuit 80 compares the magnitude of the last calculated and stored maxima or minima with a predetermined reference value. The reference value is preferably close to zero. If the absolute value of the last maxima or minima is less than the reference value, the tractor is not pitching or bouncing significantly, and the hitch may be repositioned.

At block 112, logic circuit 80 reads the position signal provide by the position sensor and compares it with upper and lower repositioning limits. These limits define a "neutral zone" where the hitch is close enough to a central position that it will not be repositioned. For a system having hard limits at 82% and 98% of the working range, the upper and lower repositioning limits are preferably about 88% and 92%. If the hitch position is within this range, the hitch is not close enough to either the upper or the lower hard limits to justify moving the hitch, and control valve is turned off at block 106, preventing fluid flow to or from hydraulic actuator 38 and thereby holding the hitch in its current position. Alternatively, if at block 112 logic circuit 80 determines that the hitch is outside of the neutral zone, the hitch is moved back toward the neutral zone at block 114 by providing the control valve with a predetermined small current that will serve to slowly move it toward the neutral zone.

Blocks 106, 110, 112, 114 therefore serve to detect whether the pitching and bouncing are below a predetermined lower threshold, and if so, they either move the hitch toward the middle of its operating range, or the hitch is fixed at its current position. This permits the hitch to be repositioned when there is significant need for pitch and bounce control, and also reduces wear on the system.

If at block 110 logic circuit 80 determines that the pitching and bouncing does exceed the threshold, then control passes to block 116, which determines whether or not the current command should be provided directly to the control valve, thus optimally controlling the pitching and bouncing, or whether, and because the hitch is approaching the upper or lower hard limits, the current command should be attenuated, so the hitch does not stop abruptly at the hard limits, which itself may cause bouncing and pitching.

To do this, logic circuit 80 determines at block 116 whether the hitch position as provided by the position transducer is between an upper soft limit and the upper hard limit or between a lower soft limit and lower hard limit. If the hitch is either between the upper soft limit (96%) and the upper hard limit (98%), or is between the lower soft limit (84%) and the lower hard limit (82%), then execution proceeds to block 118 where the current command is attenuated the appropriate amount. If the hitch is not between the soft and hard limits the current command is not attenuated, but is applied to the control valve. The attenuated and unattenuated current commands are applied to control valve 54 in block 120.

Figure 6:
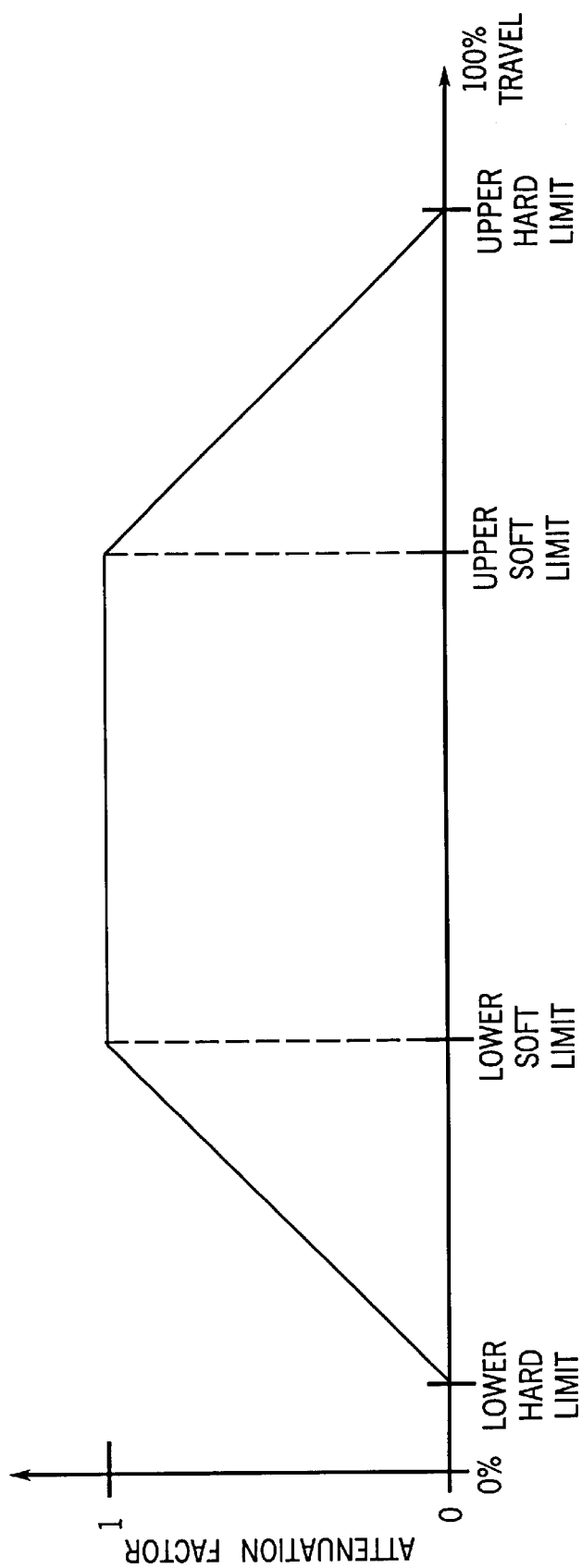
FIG. 6 is a graph showing the relationship between the attenuation factor calculated by the control circuit of FIGS. 2–5 and the hitch position.

In block 118, logic circuit 80 scales the current command by an attenuation factor that varies depending upon the hitch position. As shown in FIG. 6, the attenuation factor is a function of hitch position and varies between 1 and 0 as the hitch moves from the soft limit to the hard limit. This is true for both the upper and the lower limits, as shown in FIG. 5. By multiplying the current command by this scale factor, the current command is gradually reduced as the hitch approaches either the upper or lower hard limit, thus preventing an abrupt shutoff of the current command when the hitch reaches either hard limit. As described above and as shown in blocks 106 and 108, once the hitch reaches the upper or lower hard limits, the control valve is closed and further upward (or downward) motion outside the hard limits is prevented. If this attenuation was not provided, the hitch would be brought to an abrupt stop when either the upper or lower hard limits were reached and the control valve was turned off.

The control circuit above is preferably implemented as an electrical digital microprocessor-based circuit. It may, however, be implemented in analog electrical circuitry, hydraulic circuitry or pneumatic circuitry. The various limits described above are exemplary of those that are used in one embodiment. Other values and ranges of values may be used in different embodiments. The potentiometer used as a position transducer may be replaced with a wide range of sensors that provide an indication of position, including LVDT's, Hall-effect devices, rotary encoders, linear encoders and the like. The force transducer described above may be replaced with a variety of sensors that will provide an indication of the stress or strain generated by the pitching and bouncing, including, without limitation, strain gauges, accelerometers and the like. The band-pass filter circuit can also be implemented as a low pass and a high pass filter acting on the force signal in series.

Thus, it should be apparent that there has been provided in accordance with the present invention an EDC draft force based ride controller that fully satisfies the objectives and advantages set forth above. Although the invention has been described in conjunction with specific embodiments thereof, it is evidence that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A system for reducing the pitching of a tractor having a hitch, comprising:
    an agricultural tractor;
    a hitch coupled to the tractor and couplable to an implement and further disposed to raise and lower the implement with respect to the tractor;
    a force transducer disposed to provide a force signal indicative of a force applied to the hitch by the implement couplable to the tractor;
    a position transducer disposed to provide a position signal indicative of a position of the hitch with respect to the tractor;
    a hydraulic actuator disposed between the tractor and the hitch to raise and lower the hitch;
    a control valve disposed to control a flow rate of hydraulic fluid to and from the hydraulic actuator in response to a pitch-reducing control valve signal; and
    a control circuit coupled to and responsive to the force and position transducers to generate the valve signal, wherein the control circuit is configured to receive the force signal and derive the pitch-reducing control valve signal therefrom and apply it to the control valve and to attenuate the pitch-reducing control valve signal by one of a plurality of attenuation factors when the position signal passes a predetermined limit.

2. The system of claim 1, wherein the control circuit returns the hitch to a central position based on a signal indicative of a magnitude of pitching.

3. The system of claim 2, wherein the control circuit returns the hitch to the central position when the signal indicative of a magnitude of the pitching reaches a predetermined minimum.

4. The system of claim 1, wherein the control circuit generates the pitch-reducing control valve signal from an algorithm that is selected based upon a value indicative of a static load on the hitch.

5. The system of claim 4, wherein the control circuit selects at least one constant coefficient of the algorithm based upon the static load on the hitch.

6. The system of claim 4, wherein the control circuit includes a band-pass filter to filter the force signal, the filter having a pass band that includes force signal frequencies in the range of 1–3 Hz.

7. The system of claim 1, wherein the control circuit maintains the hitch in a predetermined range of operating heights by preventing the hitch from moving outside the predetermined range.

8. The system of claim 7, wherein the control circuit applies the pitch-reducing control valve signal to the control valve when the hitch is in a central portion of the predetermined range, and attenuates the pitch-reducing control valve signal when the hitch is inside the predetermined range and outside the central portion of the range.

9. The system of claim 1, wherein the control circuit is configured to attenuate the pitch-reducing control valve signal when the position signal is greater than the predetermined limit or less than a second predetermined limit.

10. The system of claim 9, wherein the predetermined limit and second predetermined limit are soft limits, the plurality of attenuation factors ranging from one at the soft limits to zero at respective first and second hard limits.

11. The system of claim 10, wherein the plurality of attenuation factors have a linear relationship between the soft limits and hard limits.

12. The system of claim 9, wherein the first hard limit is at approximately 98% of the full height of the hitch and the second hard limit is at approximately 82% of the full height of the hitch.

13. A method for reducing the pitching of a tractor having a hitch and an overhanging implement attached to that hitch, comprising the steps of:
    monitoring a force indicative of a load applied to the hitch;
    monitoring a position of the hitch with respect to the tractor;
    deriving a pitch-reducing control valve signal from the position of the hitch and the force; and
    attenuating the pitch-reducing control valve signal when the hitch is outside a predetermined range of hitch positions.

14. The method of claim 13, further comprising the steps of:
    determining a signal indicative of a magnitude of pitching; and
    returning the hitch to a central position based on the signal indicative of a magnitude of pitching.

15. The method of claim 13, further including the steps of:
    selecting an algorithm based upon a force signal value indicative of a static load on the hitch; and
    generating a pitch-reducing control valve signal from the algorithm.

16. The method of claim 15, further including the step of band-pass filtering the force signal with a filter having a pass band in the range of 1–3 Hz.

17. The method of claim 13, further comprising the step of preventing the hitch from moving outside a second predetermined range of operating heights that is within a wider range of operating heights mechanically attainable by the hitch.

18. The method of claim 13, wherein the predetermined range includes upper and lower soft limits, further comprising attenuating the pitch-reducing control valve signal by increasing attenuation factors as the hitch is moved further from the upper and lower soft limits.

19. A system for reducing the pitching of a work vehicle having an implement, comprising:

means for monitoring a force indicative of a load applied by the implement to the work vehicle;

means for monitoring a position of the implement relative to the work vehicle;

means for deriving a pitch-reducing control signal based on at least the force; and means for ignoring, attenuating, or directly applying the pitch-reducing control signal to control the position of the implement, wherein the pitch-reducing control signal is ignored, attenuated, or directly applied based on the implement position.

20. The system of claim 19, further comprising means for attenuating the pitch-reducing control signal by increasing attenuation factors as the implement is moved further from upper and lower soft limits.

21. The system of claim 19, further comprising:

means for determining a signal indicative of a magnitude of pitching; and means for returning the implement to a central position based on the signal indicative of a magnitude of pitching.

22. The system of claim 19, further comprising means for preventing the hitch from moving outside a predetermined range of implement positions that is within a wider range of implement positions mechanically attainable by the implement.

* * * * *